(12) United States Patent
Kayacik et al.

(10) Patent No.: US 12,505,227 B2
(45) Date of Patent: Dec. 23, 2025

(54) GROUND TRUTH ESTABLISHMENT AND LABELING TECHNIQUES USING SIGNAL AGGREGATION

(71) Applicant: Okta, Inc., San Francisco, CA (US)

(72) Inventors: Hilmi Gunes Kayacik, Bainbridge Island, WA (US); Christopher Joseph Camisa, Brooklyn, NY (US); RaghuRam Pamidimarri, Union City, CA (US); Tanvir Islam, Lake Stevens, WA (US)

(*) Notice: Subject to any disclaimer, the term of this patent is extended or adjusted under 35 U.S.C. 154(b) by 155 days.

(21) Appl. No.: 18/479,795

(22) Filed: Oct. 2, 2023

(65) Prior Publication Data

US 2025/0111057 A1    Apr. 3, 2025

(51) Int. Cl.
  *G06F 21/57*  (2013.01)
  *G06F 21/00*  (2013.01)
  *G06F 21/56*  (2013.01)
  *G06F 21/62*  (2013.01)

(52) U.S. Cl.
  CPC ............ *G06F 21/577* (2013.01); *G06F 21/56* (2013.01); *G06F 21/6218* (2013.01)

(58) Field of Classification Search
  CPC .... G06F 21/577; G06F 21/56; G06F 21/6218; G06F 21/316; G06F 21/50; G06F 21/55; G06F 21/552; G06F 21/554; G06F 21/604

See application file for complete search history.

(56) References Cited

U.S. PATENT DOCUMENTS

| 2015/0363582 | A1* | 12/2015 | Sheller | G06F 21/31 726/17 |
| 2018/0124073 | A1* | 5/2018 | Scherman | H04L 63/1491 |
| 2022/0019674 | A1* | 1/2022 | Frey | H04L 63/14 |

* cited by examiner

Primary Examiner — Edward Zee

(74) Attorney, Agent, or Firm — Holland & Hart LLP

(57) ABSTRACT

An identity management system may perform ground truth establishment and labeling techniques using signal aggregation. The identity management system may obtain, from multiple data sources, multiple data signals associated with a user of a set of multiple users of the identity management system. The identity management system may store the multiple data signals in a database. In some examples, the identity management system may aggregate the multiple data signals in the database. The identity management system may assign a label to the user based on the database. The label may indicate whether the user is malicious or benign. The identity management system may calculate a confidence level for a risk assessment product based on a comparison between the label and one or more outputs of the risk assessment product. The confidence level may indicate a confidence of the risk assessment product to classify the user as malicious or benign.

20 Claims, 10 Drawing Sheets

GROUND TRUTH ESTABLISHMENT AND LABELING TECHNIQUES USING SIGNAL AGGREGATION

FIELD OF TECHNOLOGY

The present disclosure relates generally to identity management, and more specifically to ground truth establishment and labeling techniques using signal aggregation.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

An identity management system may employ heuristics or models to assess user risk. The identity management system may evaluate an accuracy or efficacy of such heuristics or models in classifying or predicting user risk. To evaluate the heuristics or models, the identity management system may compare outputs of the models to ground truth knowledge.

SUMMARY

The described techniques relate to improved methods, systems, devices, and apparatuses that support ground truth establishment and labeling techniques using signal aggregation. For example, the described techniques provide for collection of data signals from multiple data sources to establish a ground truth or to label a user of an identity management system. The identity management system may obtain the data signals from a native source, an internal source, an external source, or from a remediation procedure. The identity management system may store the data signals in a database and may assign a risk label to a user of the identity management system. For example, the identity management system may aggregate the data signals and may determine that the user is malicious or benign. In some examples, the identity management system may leverage the label or the data signals stored in the database, which may be referred to as ground truth data signals, to evaluate an efficacy of one or more risk assessment products.

A method by an apparatus for risk assessment at an identity management system is described. The method may include obtaining, over a duration and from a set of multiple data sources, a set of multiple data signals associated with a user of a set of multiple users of the identity management system, where the set of multiple data signals are obtained via at least a device of the identity management system, storing the set of multiple data signals in a database associated with the identity management system, assigning, at the device of the identity management system, a label to the user based on the database, where the label indicates whether the user is malicious or benign, and calculating, at the device of the identity management system, a confidence level for a risk assessment product of the identity management system based on a comparison between the label and one or more outputs of the risk assessment product, where the confidence level indicates a confidence of the risk assessment product to classify the user as malicious or benign.

An apparatus for risk assessment at an identity management system is described. The apparatus may include one or more memories storing processor executable code, and one or more processors coupled with the one or more memories. The one or more processors may individually or collectively operable to execute the code to cause the apparatus to obtain, over a duration and from a set of multiple data sources, a set of multiple data signals associated with a user of a set of multiple users of the identity management system, store the set of multiple data signals in a database associated with the identity management system, assign a label to the user based on the database, where the label indicates whether the user is malicious or benign, and calculate a confidence level for a risk assessment product based on a comparison between the label and one or more outputs of the risk assessment product of the identity management system, where the confidence level indicates a confidence of the risk assessment product to classify the user as malicious or benign.

Another apparatus for risk assessment at an identity management system is described. The apparatus may include means for obtaining, over a duration and from a set of multiple data sources, a set of multiple data signals associated with a user of a set of multiple users of the identity management system, where the set of multiple data signals are obtained via at least a device of the identity management system, means for storing the set of multiple data signals in a database associated with the identity management system, means for assigning a label to the user based on the database, where the label indicates whether the user is malicious or benign, and means for calculating a confidence level for a risk assessment product of the identity management system based on a comparison between the label and one or more outputs of the risk assessment product, where the confidence level indicates a confidence of the risk assessment product to classify the user as malicious or benign.

A non-transitory computer-readable medium storing code is described. The code may include instructions executable by a processor to obtain, over a duration and from a set of multiple data sources, a set of multiple data signals associated with a user of a set of multiple users of an identity management system, where the set of multiple data signals are obtained via at least a device of the identity management system, store the set of multiple data signals in a database associated with the identity management system, assign a label to the user based on the database, where the label indicates whether the user is malicious or benign, and calculate a confidence level for a risk assessment product of the identity management system based on a comparison between the label and one or more outputs of the risk assessment product, where the confidence level indicates a confidence of the risk assessment product to classify the user as malicious or benign.

In some examples of the method, apparatus, and non-transitory computer-readable medium described herein, storing the set of multiple data signals in the database may include operations, features, means, or instructions for aggregating the set of multiple data signals in the database, where the assigning the label may be based on the aggregation.

Some examples of the method, apparatus, and non-transitory computer-readable medium described herein may further include operations, features, means, or instructions for obtaining one or more outputs from the risk assessment product, where each of the one or more outputs indicates whether the user may be malicious or benign and classifying each output of the one or more outputs of the risk assessment product as a false positive, a true positive, a false negative, or a combination thereof, based on comparing the respective output with the label or with one or more data signals of the set of multiple data signals.

In some examples of the method, apparatus, and non-transitory computer-readable medium described herein, the confidence level may be based on a first quantity of false positives, a second quantity of true positives, a third quantity of false negatives, or a combination thereof.

Some examples of the method, apparatus, and non-transitory computer-readable medium described herein may further include operations, features, means, or instructions for assigning, to an output of the one or more outputs and for each data signal of the one or more data signals, a false positive instance, a true positive instance, or a false negative instance based on comparing the output with the respective data signal and combining, using a mathematical function, the false positive instances, the true positive instances, or the false negative instances, where the classifying the output may be based on the mathematical function.

In some examples of the method, apparatus, and non-transitory computer-readable medium described herein, the set of multiple data sources includes a native source, a data source associated with a remediation procedure, an internal source, an external source, or a combination thereof.

In some examples of the method, apparatus, and non-transitory computer-readable medium described herein, the set of multiple data signals includes a report of suspicious activity from the user or an administrator, a multi-factor authentication confirmation, a security intelligence signal, a feed from a third party entity different from the user, or a combination thereof.

In some examples of the method, apparatus, and non-transitory computer-readable medium described herein, the database may be updated at a first periodicity, assigning the label may be repeated at a second periodicity, and calculating the confidence level may be repeated at a third periodicity.

In some examples of the method, apparatus, and non-transitory computer-readable medium described herein, assigning the label may include operations, features, means, or instructions for assigning the label to a set of data signals of the set of multiple data signals, the set of data signals corresponding to an internet protocol address, an organization, or a session with the identity management system.

In some examples of the method, apparatus, and non-transitory computer-readable medium described herein, the label may be applicable to a quantity of requests of the user or may be applicable to the user over a second duration.

DETAILED DESCRIPTION

Figure 1:
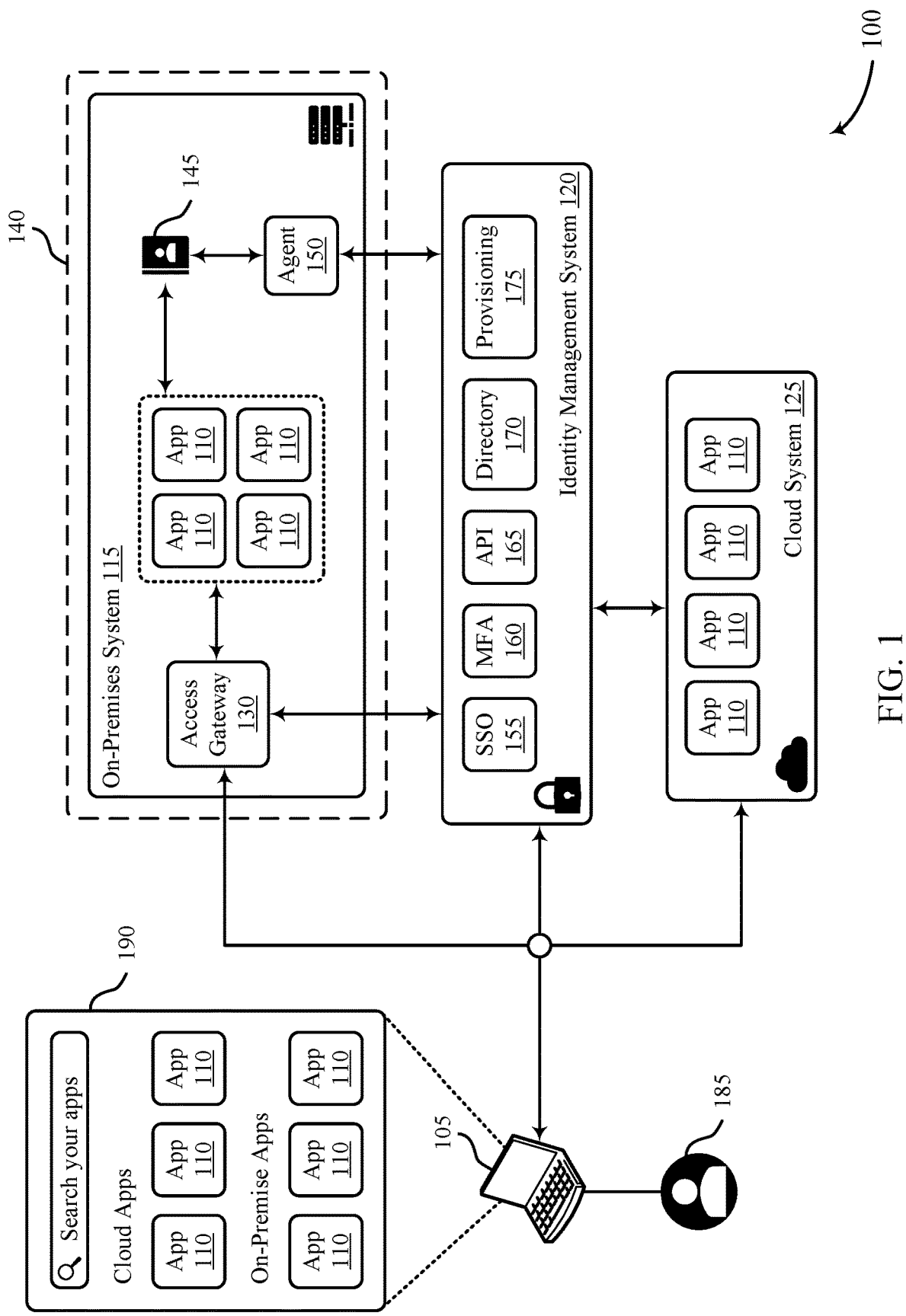
FIG. 1 illustrates an example of a computing system that supports ground truth establishment and labeling techniques using signal aggregation in accordance with aspects of the present disclosure.

An identity management system may utilize one or more risk assessment products to classify user risk. Using the one or more risk assessment products, the identity management system may classify users of the identity management system as malicious or benign. In some examples, it may be beneficial to compare the risk assessment product to a ground truth, which may serve as a benchmark for evaluating an efficacy (or accuracy) of the risk assessment product in classifying user risk. The ground truth may, for example, indicate that a given data sample is malicious or benign. To determine the efficacy of the risk assessment product, the identity management system may compare outputs of the risk assessment product with ground truths. However, knowledge of ground truths may not be easily accessible to the identity management system.

In accordance with examples described herein, the identity management system may obtain data signals from multiple sources to support ground truth establishment and labeling techniques. The identity management system may store the data signals in a database and may assign labels to one or more users of the identity management system, labeling the user (e.g., a user account with the identity management system) as malicious or benign. The label may be used as a ground truth for evaluation of risk assessment products (e.g., to evaluate precision and recall metrics for the risk assessment products). For example, the identity management system may evaluate an efficacy of a risk assessment product by comparing outputs of the risk assessment product with the label. By performing such a comparison, the identity management system may calculate one or more metrics (e.g., precision, recall) of the risk assessment product, which may enable the identity management system to classify user risk with greater accuracy and to assess and improve upon risk assessment products with respect to accuracy and efficacy, among other benefits.

In some examples, the identity management system may obtain outputs of the risk assessment product and may classify each of the outputs as one or more of a false positive, a true positive, or a false negative. Classification of the outputs may be based on the ground truth label or the ground truth data signals stored in the database. For example, the identity management system may classify a successful multi-factor authentication (MFA) signal for a relatively high risk user as a false positive and a bad internet protocol (IP) address (e.g., an IP address associated with malicious or fraudulent behavior) for the relatively high risk user as a true positive. In some examples, the identity management system may count instances of false positives, true positives, or false negatives for an output of the risk assessment product by comparing the output to data from different data sources. The identity management system may combine evaluations from the multiple data sources into an overall evaluation of the output using a mathematical function. The identity management system may aggregate data in the database to assign or create the label for the user. The label may apply to one or more of an IP address, an organization, or a session with the identity management system. The label may apply to the user for a quantity of requests or for a time duration.

The described techniques may enable the identity management system to assess or evaluate user risk products for efficacy. By evaluating the user risk products, the identity management system may implement various improvements to the user risk products to increase their efficacy and, in some cases, may determine one or more (e.g., which) user risk products have a high efficacy relative to other products, which may support increased accuracy in assessment of user risk.

Aspects of the disclosure are initially described in the context of a computing system. Aspects of the disclosure are further described in the context of ground truth schemes, flowcharts, and process flows. Aspects of the disclosure are further illustrated by and described with reference to apparatus diagrams, system diagrams, and flowcharts that relate to ground truth establishment and labeling techniques using signal aggregation.

FIG. 1 illustrates an example of a computing system 100 that supports ground truth establishment and labeling techniques using signal aggregation in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

An identity management system 120 may obtain, over a duration and from multiple data sources (e.g., a user 185, an app 110, an MFA 160), multiple data signals associated with a user 185 of multiple users 185 of the identity management system 120. For example, the identity management system 120 may obtain one or more of the data signals via one or more compute resources of the identity management system, via one or more compute resources of the cloud system 125, or via a software agent, such as the software agent 150 or via another software agent of the identity management system which may be installed on the computing device 105. The identity management system 120 may store the multiple data signals in a database associated with the identity management system 120 (e.g., an internal databased of the identity management system 120 or an external databased used by the identity management system 120) and may assign a label to the user 185 based on the database. The label may indicate whether the user 185 is malicious or benign. The identity management system 120 may calculate a confidence level for a risk assessment product of the identity management system (e.g., a risk assessment product hosted by the identity management system 120, a risk assessment product developed by the identity management system 120, a risk assessment product evaluated by the identity management system 120) based on a comparison between the label and one or more outputs of the risk assessment product. The confidence level may indicate a confidence of the risk assessment product to classify the user as malicious or benign.

Figure 2:
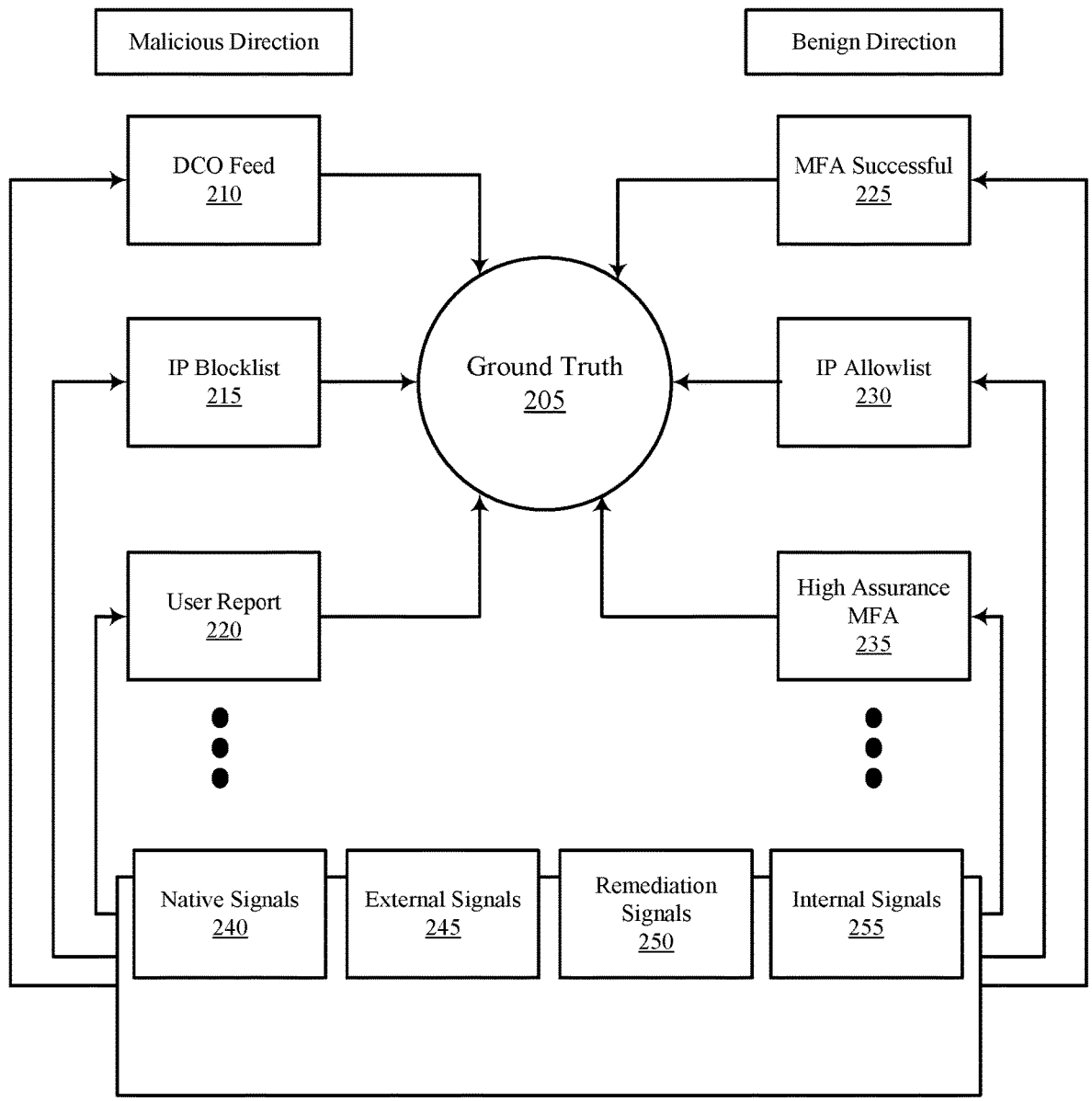
FIG. 2 shows an example of a ground truth scheme that supports ground truth establishment and labeling techniques using signal aggregation in accordance with aspects of the present disclosure.

FIG. 2 shows an example of a ground truth scheme 200 that supports ground truth establishment and labeling techniques using signal aggregation in accordance with aspects of the present disclosure. The ground truth scheme 200 may implement or be implemented by aspects of the system 100. For example, the ground truth scheme 200 may be implemented at the identity management system 120 as illustrated by and described with reference to FIG. 1.

Ground truth signals may contain relatively high confidence and conclusive evidence of a behavior. For example, tracking malicious or benign behavior, or identifying trusted proxies or confirmed phishing IPs, may fall under the ground truth signal category. That is, in addition to producing "benign" or "malicious" labels, ground truth signals may provide additional information pertaining to user behavior. In some examples, if a sample is not labeled as "malicious" the identity management system may determine (e.g., assume) that the sample is benign. Identity management systems may have access to relatively large quantities of data, but much of the data may be unlabeled. In some examples, an identity management system may utilize manual analysis or relatively high confidence heuristics to label data. However, a percentage of total accessible data that the identity management system is capable of labeling confidently may be relatively low. Accordingly, techniques for collection of ground truth signals may be beneficial for building, deploying, and monitoring machine learning models with greater efficacy and accuracy.

Machine learning algorithms may learn from a training set that contains labeled data. Ground truth signals may be used directly as labels or may be aggregated (e.g., using a variety of aggregation techniques, which may include mathematical formulas) to generate a label (e.g., the desired label). The identity management system may deploy various models (e.g., rule-based models, machine learning-based models, risk assessment products) and the identity management system may evaluate the various models based on efficacy measurements that can be computed from labeled data such as true positive and false positive rates. For the efficacy measurements to yield accurate results, the efficacy measurements are performed based on ground truth that is highly accurate and covers a broad range of data from multiple data sources.

Multiple signals from multiple different data sources may be available to the identity management system (e.g., collected by or otherwise available to the identity management system), and the identity management system may combine multiple signals from multiple data sources to produce the ground truth 205 (e.g., an overall ground truth signal). By combining multiple signals to produce the ground truth 205, the ground truth 205 may have a greater confidence level relative to a confidence level of each individual signal.

Examples of the types of signals to be combined to produce the ground truth 205 may include native signals 240, external signals 245, remediation signals 250, or internal signals 255. Some data signals may indicate that a user of the identity management system is malicious, while other data signals may indicate that the user is benign. The identity management system may aggregate the data signals from multiple sources to arrive at the overall ground truth 205. For example, the identity management system may weigh (e.g., assign a weighting to) some data signals, or some data sources, more than others based on a perceived reliability or a measured (e.g., calculated) reliability of the respective data sources or data signals.

Examples of the remediation signals 250 may be an MFA successful signal 225, which may be received from a user in response to an MFA request, or a high assurance MFA 235. In some examples, the ground truth signals for determining the ground truth 205 may be unidirectional. For example, if a user is authenticated with the high assurance MFA 235 (e.g., or sends the MFA successful signal 225), the identity management system may be confident that any request from the user is a benign request (e.g., a legitimate, or non-threatening, request). However, if the user fails to authenticate (e.g., fails to send the high assurance MFA to the identity management system, fails to respond to an MFA request with the MFA successful signal 225), the identity management system may not have confidence that the user is malicious (e.g., non-legitimate, a threat actor). For example, the user may fail the MFA for various reasons (e.g., being distracted, giving up on an MFA flow, moving on to a different task or app, among other reasons). The types of signals illustrated in FIG. 2 should not be considered an exhaustive list of signals that may be used for establishment of the ground truth 205. The identity management system may use, combine, or aggregate additional types of signals not shown.

Examples of the external signals 245 or the internal signals 255 may be an IP allowlist 230 (e.g., a whitelist of IP addresses, an allowed list of IP addresses, IP addresses considered relatively low risk) or an IP blocklist 215 (e.g., a blacklist of IP addresses, a deny or block list of IP addresses, IP addresses considered relatively high risk). The internal signals 255 may include one or more signals that an identity management system produces or that any entity associated with or linked to the identity management system may produce. The external signals 245 may include one or more signals that the identity management system may receive or obtain via a third party (e.g., via third party security research, or via one or more third party reputation entities, products, feeds, or organizations). In some examples, ground truth signals may be associated with different levels of granularity and may be applied non-uniformly across requests of a given user or entity. For example, the IP blocklist 215 may be a daily bad IP list and may label an IP as malicious for a day for a given organization. A user report 220, which may be an example of a native signal 240, may include a user reporting suspicious activity. The user report 220 may apply on a per-request basis and may report a particular request as malicious. A defensive cybersecurity operation (DCO) feed 210 may be an example of an external signal 245 and may label IPs or usernames that are associated with or involved in an attack (e.g., a cybersecurity attack).

Figure 3:
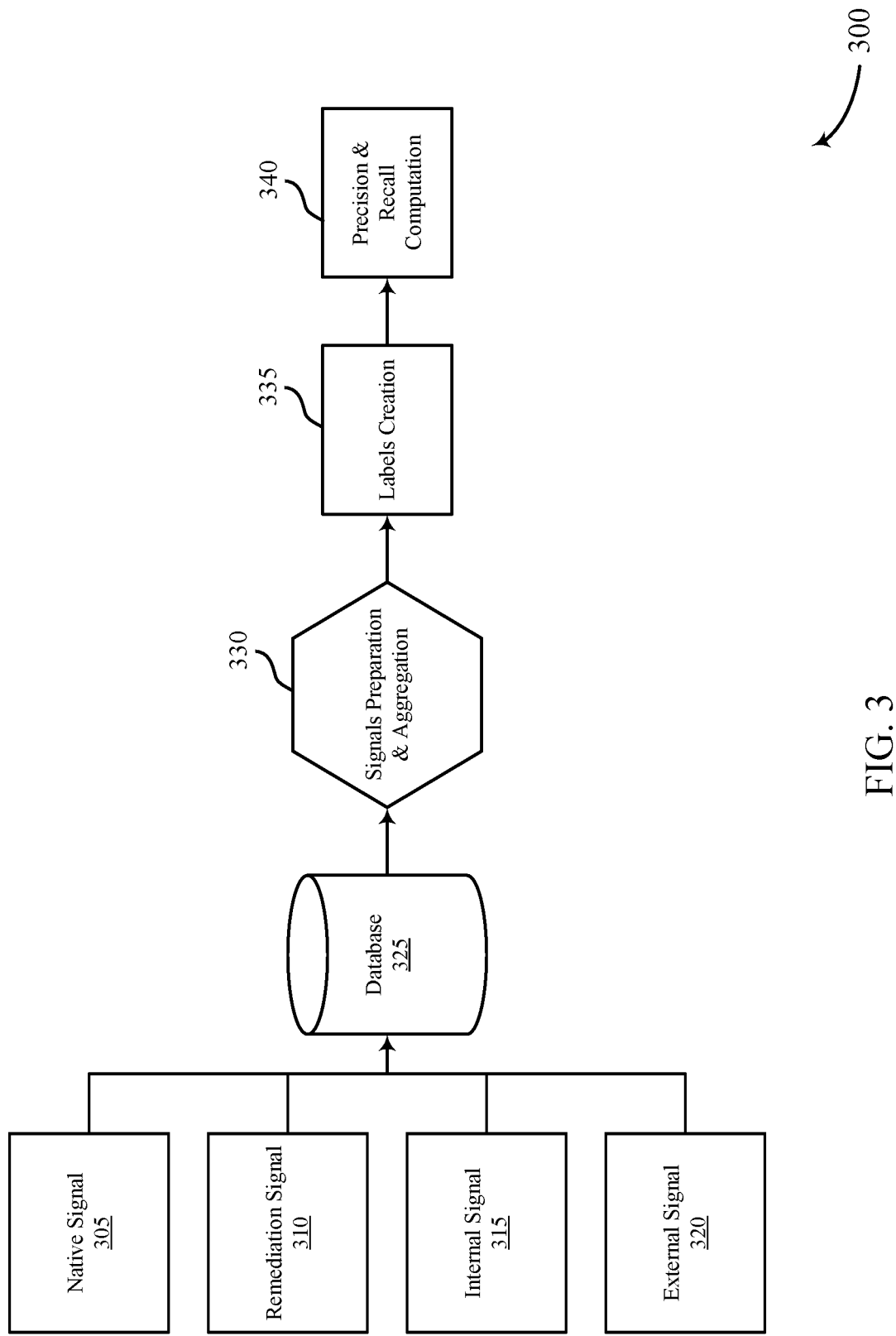
FIG. 3 shows an example of a flowchart that supports ground truth establishment and labeling techniques using signal aggregation in accordance with aspects of the present disclosure.

FIG. 3 shows an example of a flowchart 300 that supports ground truth establishment and labeling techniques using signal aggregation in accordance with aspects of the present disclosure. The flowchart 300 may implement or be implemented by aspects of the system 100 or the ground truth scheme 200. For example, the flowchart 300 may be implemented at the identity management system 120 as illustrated by and described with reference to FIG. 1.

An identity management system may obtain multiple data signals from multiple data sources, and the data signals may be associated with a user of the identity management system (e.g., a user account of the identity management system). For example, the identity management system may obtain a native signal 305 (e.g., from a native data source), a remediation signal 310 (e.g., from a data source of a remediation procedure or MFA), an internal signal 315 (e.g., from an internal data source), an external signal 320 (e.g., from an external data source), or a combination thereof. An example of the native signal 305 may be a report of suspicious activity from the user or an administrator. The remediation signal 310 may be the MFA successful signal 225 or the high assurance MFA 235, as described with reference to FIG. 2, among other examples of remediation signals. An example of the internal signal 315 may be an internal security intelligence signal (e.g., from a security intelligence product or app). The external signal 320 may be a third party feed (e.g., from an entity that is different from the user). The third party feed may include a list of IPs, such as the IP allowlist 230 or the IP blocklist 215, as described with reference to FIG. 2. The internal signal 315 may be a signal that the identity management system produces or that any entity associated with or linked to the identity management system may produce. The external signal 320 may include one or more signals that the identity management system may receive or obtain via a third party (e.g., via third party security research, or via one or more third party reputation entities, products, feeds, or organizations). It is to be understood that the types of data signals described herein are examples and other types of data signals are not precluded. The examples described herein should not be considered limiting to the scope covered by the claims or the disclosure.

The identity management system may store the multiple data signals in a database 325. The database 325 may be an existing database of the identity management system, or the internal management system may create a dedicated database for storage of ground truth signals. At 330, the identity management system may prepare (e.g., clean, filter) the multiple signals and may aggregate the multiple data signals in the database. For example, the identity management system may aggregate the multiple data signals according to a granularity of each data signal, a reliability score of each data signal, or by assigning weightings to some data signals over others, among other aggregation schemes. In some examples, the identity management system may apply one or more mathematical functions (e.g., linear combination, one or more algorithms) to the multiple data signals. In some cases, the aggregation of the multiple signals may produce an overall ground truth 205, as described in greater detail with reference to FIG. 2.

At 335, the identity management system may assign a label to the user based on the database (e.g., based on the aggregation of the multiple data signals). The label may indicate whether the user is malicious or benign. In some examples, the label may be applicable to a quantity of requests (e.g., one request, an identified request) from the user to the identity management system. In some examples, the label may apply to the user over a time duration (e.g., minute, hour, day, week, etc.), or the label may apply to the user indefinitely. In some cases, the identity management system may assign the label to a set of data signals of the multiple data signals. For example, the label may apply to data signals of an IP address, of an organization, or of a session with the identity management session.

At 340, the identity management system may calculate one or more confidence or efficacy metrics for a risk assessment product by comparing the label, or one or more ground truth signals of the database 325, with one or more outputs of the risk assessment product. For example, the identity management system may calculate a precision and a recall for the risk assessment product, which may be indicative of a confidence of the risk assessment product to classify the user as malicious or benign. In some examples, the identity management system may count (e.g., assign to each output) instances of false positives, true positives, and false negatives among outputs of the risk assessment product by comparing the output with a ground truth data signal of the database 325.

In an example, the output of the risk assessment product may indicate that the user is malicious (e.g., high risk), but a remediation signal 310 may include an MFA success signal indicating that the user is benign, which may trigger a false positive instance. In another example, the output of the risk assessment product may indicate that the user is malicious, and an external signal 320 may include an IP blocklist indicating that an IP associated with the user is malicious, which may trigger a true positive instance. In yet another example, the output of the risk assessment product may indicate that the user is benign (e.g., low risk, no detected risk), but an external signal 320 may include a DCO feed (e.g., the DCO feed 210 as described with reference to FIG. 2) indicating that the user (e.g., or an IP) is malicious, which may trigger a false negative instance. In some examples, the identity management system may combine, using a mathematical function (e.g., a maximum), the false positive instances, the true positive instances, or the false negative instances to classify the output (e.g., assign an overall or total evaluation of the output) as a false negative, a true positive, a false positive, or a combination thereof.

Figure 4:
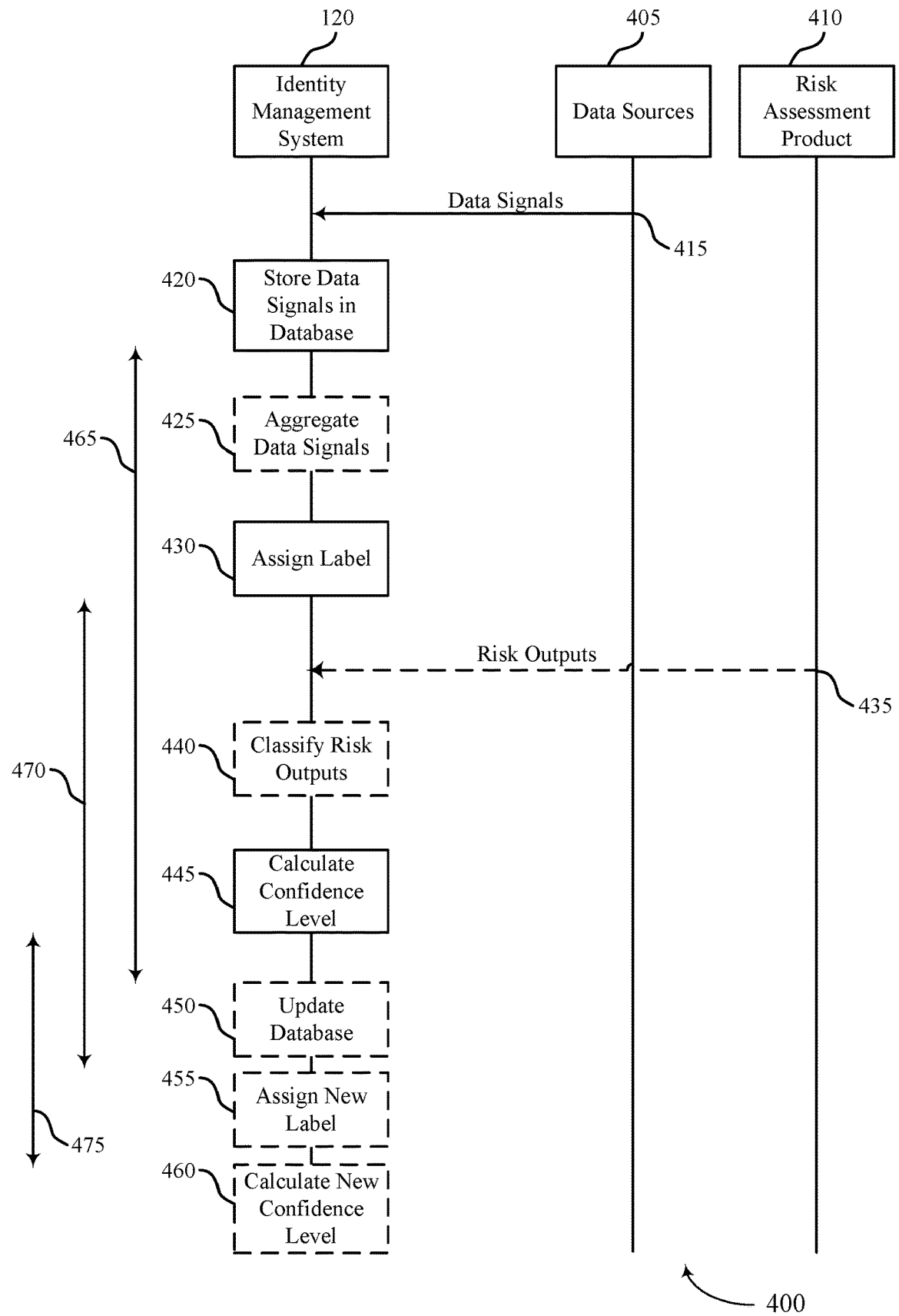
FIG. 4 shows an example of a process flow that supports ground truth establishment and labeling techniques using signal aggregation in accordance with aspects of the present disclosure.

FIG. 4 shows an example of a process flow 400 that supports ground truth establishment and labeling techniques using signal aggregation in accordance with aspects of the present disclosure. The process flow 400 may implement aspects of the system 100, the ground truth scheme 200, and the flowchart 300. For example, the process flow 400 may include an identity management system 120, which may each be an example of the identity management system 120 illustrated by and described with reference to FIG. 1. The process flow 400 may also include data sources 405, which may include, for example, a user 185, an app 110, or an MFA 160, which are illustrated by and described with reference to FIG. 1.

In the following description of the process flow 400, the operations performed at the identity management system 120, the data sources 405, and the risk assessment product 410 may be performed in different orders or at different times than shown. Additionally, or alternatively, some operations may be omitted from the process flow 400 and other operations may be added to the process flow 400.

At 415, the identity management system 120 may obtain, over a duration and from the multiple data sources 405 (e.g., native sources, remediation sources, internal sources, external sources), multiple data signals associated with a user of a set of multiple users of the identity management system.

At 420, the identity management system 120 may store the multiple data signals in a database associated with the identity management system 120. In some examples, at 425, the identity management system may aggregate the multiple data signals in the database.

At 430, the identity management system 120 may assign a label to the user based on the database. The label may indicate whether the user is malicious or benign. In some examples, the identity management system may assign the label to a set of data signals of the multiple data signals. The set of data signals may correspond to an IP address, an organization, or a session with the identity management system. In some examples, the label may be applicable to a quantity of requests of the user (e.g., a single request) or may be applicable to the user over a second duration (e.g., an hour, a day, a week).

At 435, the identity management system 120 may obtain one or more outputs of a risk assessment product 410. Each of the one or more outputs may indicate whether the user is malicious or benign (e.g., for a request, over a time duration). In some examples, at 440, the identity management system 120 may classify each output of the one or more outputs of the risk assessment product 410 as a false positive, a true positive, a false negative, or a combination thereof, based on comparing the respective output with the label or with one or more signals of the multiple data signals.

At 445, the identity management system 120 may calculate a confidence level (e.g., precision, recall) for the risk assessment product 410 based on a comparison between the label and one or more outputs of the risk assessment product 410. The confidence level may indicate a confidence (e.g., an efficacy or accuracy) of the risk assessment product to classify the user as malicious or benign.

In some examples, the identity management system 120 may implement a pipeline (e.g., a workflow, an automated process) to perform or repeat one or more steps of the process flow 400, for example, on a schedule or at one or more periodicities. For example, at 450, the identity management system 120 may update the database in accordance with a first periodicity 465 (e.g., based on data received from one or more of the data sources 405 over a duration that occurs between two consecutive updates). At 455, the identity management system may assign a new label to the user in accordance with a second periodicity 470. At 460, the identity management system may calculate a new confidence level for the risk assessment product 410 in accordance with a third periodicity 475. The respective duration of the first periodicity 465, the second periodicity 470, and the third periodicity 475 may correspond to a same periodicity or different periodicities. Additionally, the respective duration of the first periodicity 465, the second periodicity 470, or the third periodicity 475 may change (e.g., dynamically) based on the confidence level, implementation of the identity management system 120, or implementation of the risk assessment products, among other factors.

Figure 5:
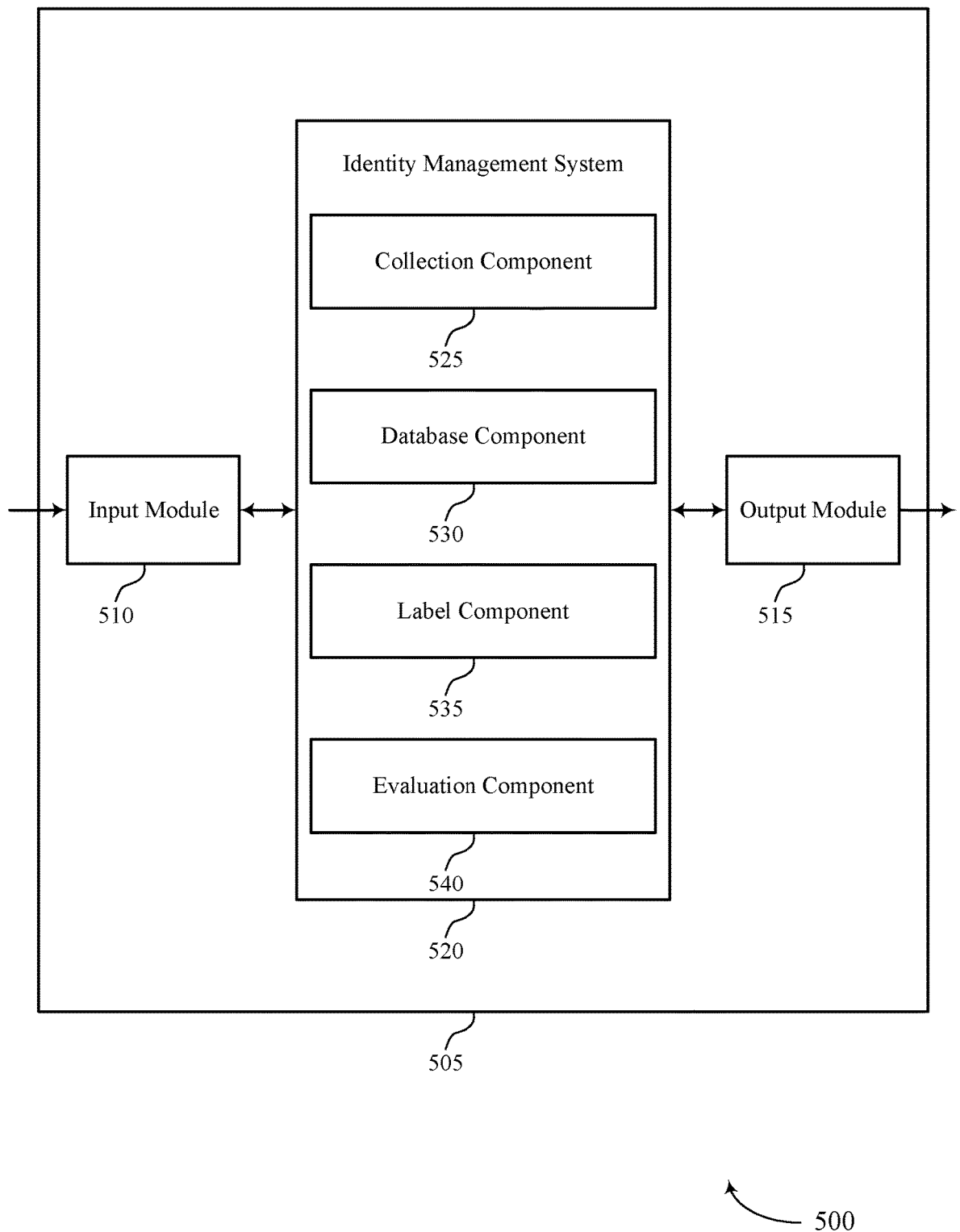
FIG. 5 shows a block diagram of an apparatus that supports ground truth establishment and labeling techniques using signal aggregation in accordance with aspects of the present disclosure.

FIG. 5 shows a block diagram 500 of a device 505 that supports ground truth establishment and labeling techniques using signal aggregation in accordance with aspects of the present disclosure. The device 505 may include an input module 510, an output module 515, and an identity management system 520. The device 505, or one or more components of the device 505 (e.g., the input module 510, the output module 515, and the identity management system 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the identity management system 520 to support ground truth establishment and labeling techniques using signal aggregation. In some cases, the input module 510 may be a component of an input/output (I/O) controller 710 as described with reference to FIG. 7.

The output module 515 may manage output signals for the device 505. For example, the output module 515 may receive signals from other components of the device 505, such as the identity management system 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the identity management system 520 may include a collection component 525, a database component 530, a label component 535, an evaluation component 540, or any combination thereof. In some examples, the identity management system 520, or various components thereof, may be configured to perform various operations (e.g., receiving, monitoring, transmitting) using or otherwise in cooperation with the input module 510, the output module 515, or both. For example, the identity management system 520 may receive information from the input module 510, send information to the output module 515, or be integrated in combination with the input module 510, the output module 515, or both to receive information, transmit information, or perform various other operations as described herein.

The collection component 525 may be configured to support obtaining, over a duration and from a set of multiple data sources, a set of multiple data signals associated with a user of a set of multiple users of an identity management system. The database component 530 may be configured to support storing the set of multiple data signals in a database. The label component 535 may be configured to support assigning a label to the user based on the database, where the label indicates whether the user is malicious or benign. The evaluation component 540 may be configured to support calculating a confidence level for a risk assessment product based on a comparison between the label and one or more outputs of the risk assessment product, where the confidence level indicates a confidence of the risk assessment product to classify the user as malicious or benign.

Figure 6:
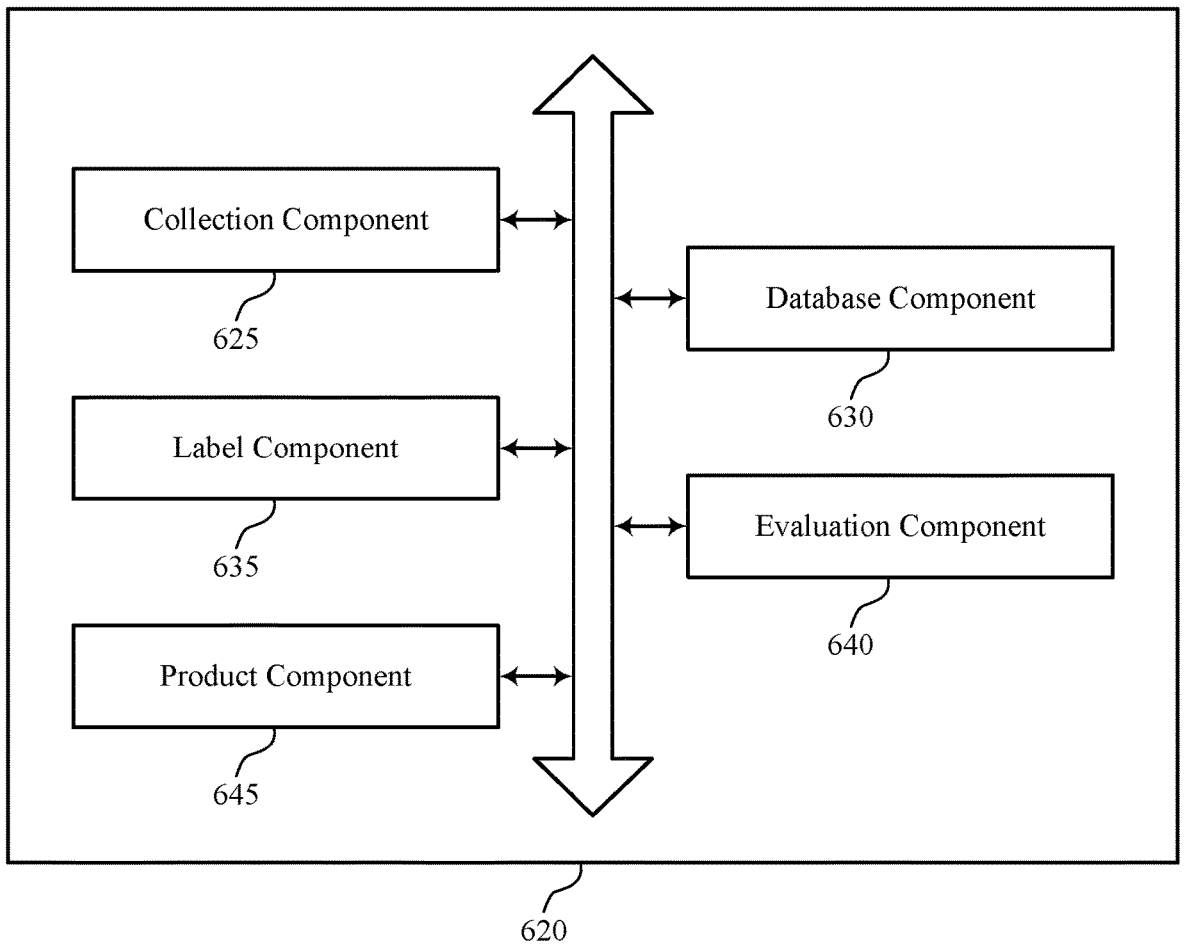
FIG. 6 shows a block diagram of an identity management system that supports ground truth establishment and labeling techniques using signal aggregation in accordance with aspects of the present disclosure.

FIG. 6 shows a block diagram 600 of an identity management system 620 that supports ground truth establishment and labeling techniques using signal aggregation in accordance with aspects of the present disclosure. The identity management system 620 may be an example of aspects of an identity management system or an identity management system 520, or both, as described herein. The identity management system 620, or various components thereof, may be an example of means for performing various aspects of ground truth establishment and labeling techniques using signal aggregation as described herein. For example, the identity management system 620 may include a collection component 625, a database component 630, a label component 635, an evaluation component 640, a product component 645, or any combination thereof. Each of these components, or components of subcomponents thereof (e.g., one or more processors, one or more memories), may communicate, directly or indirectly, with one another (e.g., via one or more buses).

The collection component 625 may be configured to support obtaining, over a duration and from a set of multiple data sources, a set of multiple data signals associated with a user of a set of multiple users of the identity management system. The database component 630 may be configured to support storing the set of multiple data signals in a database. The label component 635 may be configured to support assigning a label to the user based on the database, where the label indicates whether the user is malicious or benign. The evaluation component 640 may be configured to support calculating a confidence level for a risk assessment product based on a comparison between the label and one or more outputs of the risk assessment product, where the confidence level indicates a confidence of the risk assessment product to classify the user as malicious or benign.

In some examples, to support storing the set of multiple data signals in the database, the database component 630 may be configured to support aggregating the set of multiple data signals in the database, where the assigning the label is based on the aggregation.

In some examples, the product component 645 may be configured to support obtaining one or more outputs from the risk assessment product, where each of the one or more outputs indicates whether the user is malicious or benign. In some examples, the evaluation component 640 may be configured to support classifying each output of the one or more outputs of the risk assessment product as a false positive, a true positive, a false negative, or a combination thereof, based on comparing the respective output with the label or with one or more data signals of the set of multiple data signals.

In some examples, the confidence level is based on a first quantity of false positives, a second quantity of true positives, a third quantity of false negatives, or a combination thereof.

In some examples, the evaluation component 640 may be configured to support assigning, to an output of the one or more outputs and for each data signal of the one or more data signals, a false positive instance, a true positive instance, or a false negative instance based on comparing the output with the respective data signal. In some examples, the evaluation component 640 may be configured to support combining, using a mathematical function, the false positive instances, the true positive instances, or the false negative instances, where the classifying the output is based on the mathematical function.

In some examples, the set of multiple data sources includes a native source, a data source associated with a remediation procedure, an internal source, an external source, or a combination thereof.

In some examples, the set of multiple data signals includes a report of suspicious activity from the user or an administrator, a multi-factor authentication confirmation, a security intelligence signal, a feed from a third party entity different from the user, or a combination thereof.

In some examples, the database is updated at a first periodicity, assigning the label is repeated at a second periodicity, and calculating the confidence level is repeated at a third periodicity.

In some examples, to support assigning the label, the label component 635 may be configured to support assigning the label to a set of data signals of the set of multiple data signals, the set of data signals corresponding to an internet protocol address, an organization, or a session with the identity management system.

In some examples, the label is applicable to a quantity of requests of the user or is applicable to the user over a second duration.

Figure 7:
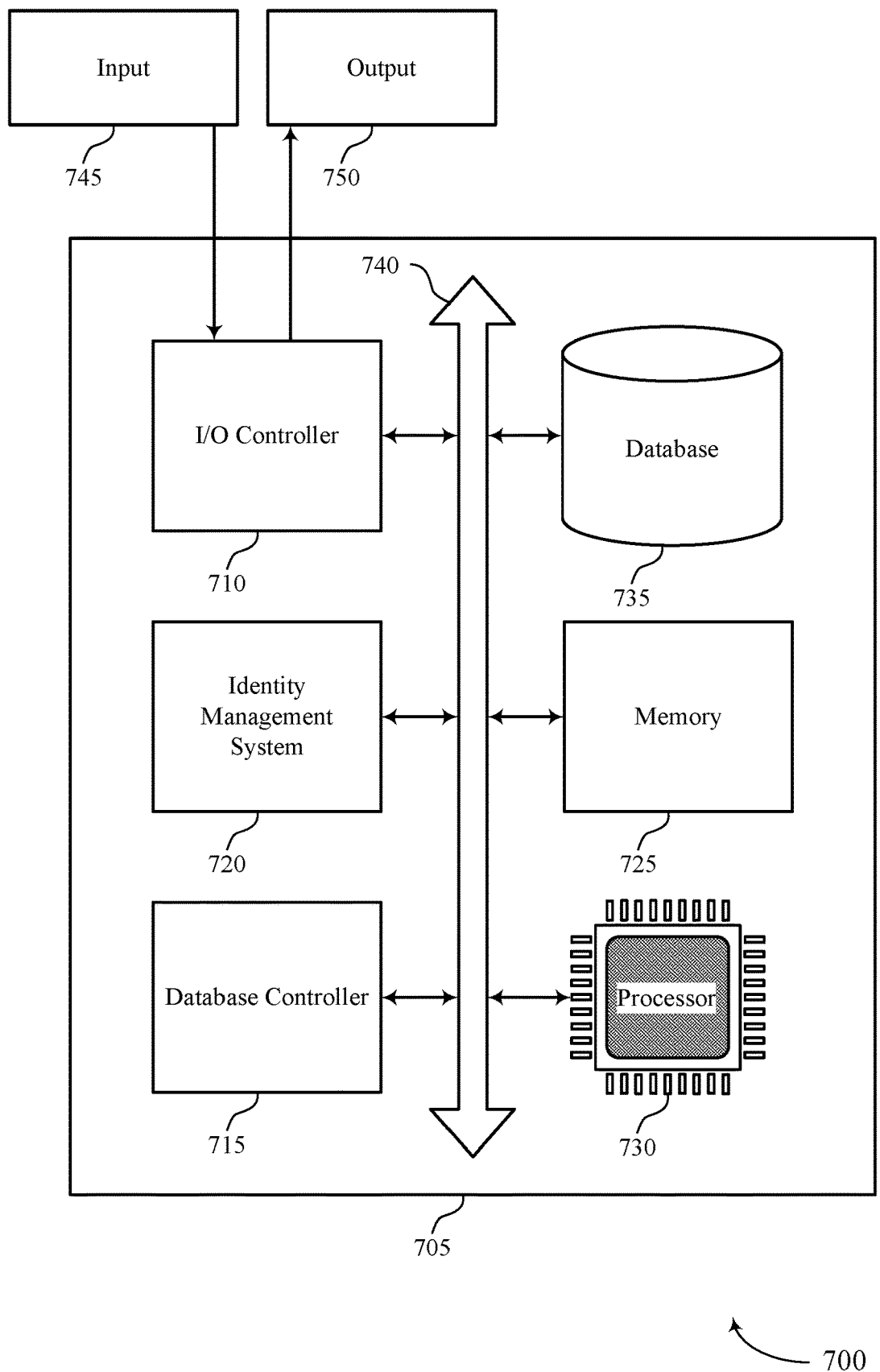
FIG. 7 shows a diagram of a system including a device that supports ground truth establishment and labeling techniques using signal aggregation in accordance with aspects of the present disclosure.

FIG. 7 shows a diagram of a system 700 including a device 705 that supports ground truth establishment and labeling techniques using signal aggregation in accordance with aspects of the present disclosure. The device 705 may be an example of or include the components of a device 505 as described herein. The device 705 may include components for bi-directional voice and data communications including components for transmitting and receiving communications, such as an identity management system 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting ground truth establishment and labeling techniques using signal aggregation). The processor 730 may be an example of a single processor or multiple processors. For example, the device 705 may include one or more processors 730.

For example, the identity management system 720 may be configured to support obtaining, over a duration and from a set of multiple data sources, a set of multiple data signals associated with a user of a set of multiple users of the identity management system. The identity management system 720 may be configured to support storing the set of multiple data signals in a database. The identity management system 720 may be configured to support assigning a label to the user based on the database, where the label indicates whether the user is malicious or benign. The identity management system 720 may be configured to support calculating a confidence level for a risk assessment product based on a comparison between the label and one or more outputs of the risk assessment product, where the confidence level indicates a confidence of the risk assessment product to classify the user as malicious or benign.

By including or configuring the identity management system 720 in accordance with examples as described herein, the device 705 may support techniques for increased accuracy for evaluation of risk assessment products, increased user security, and less frequent cybersecurity attacks.

Figure 8:
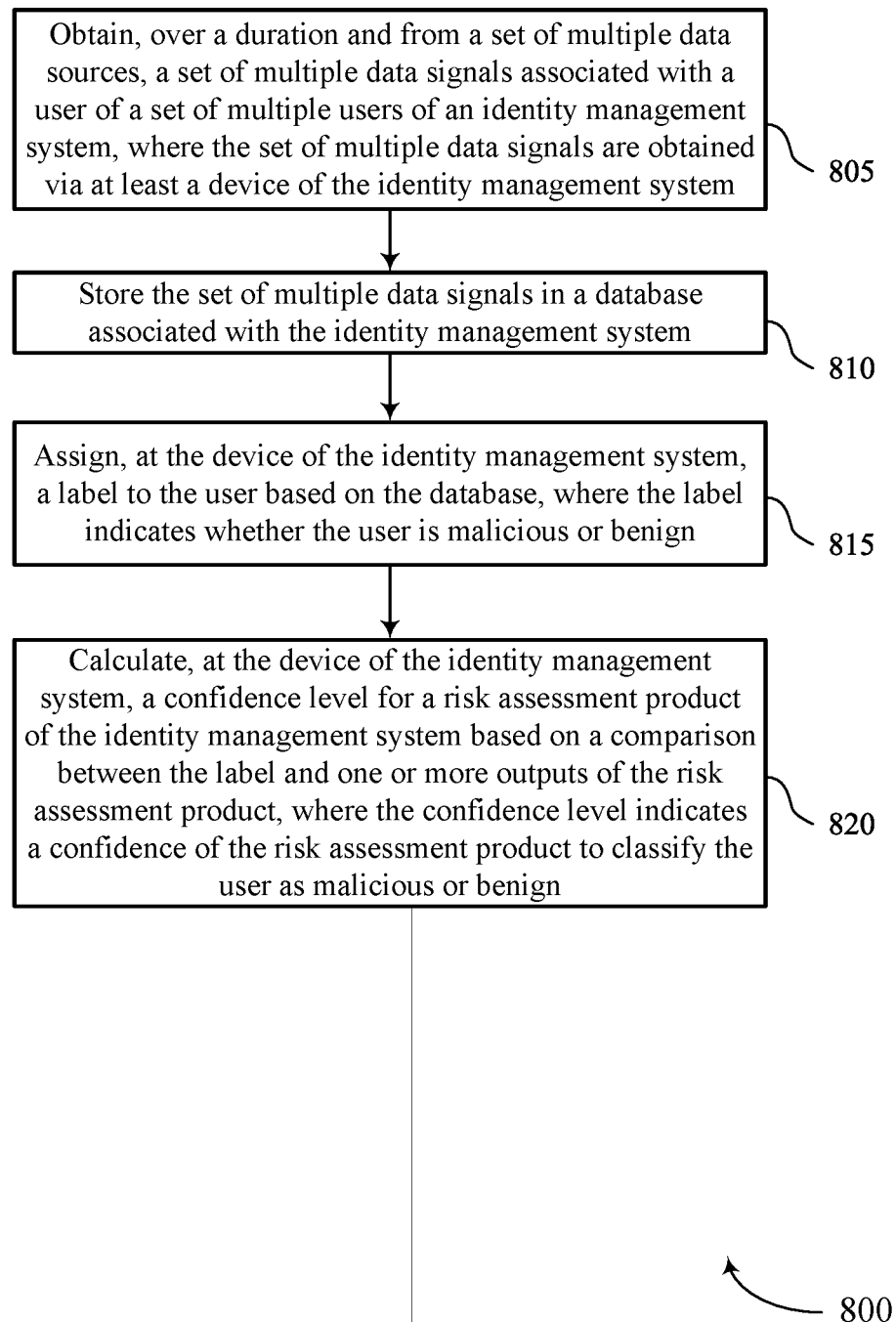
FIGS. 8 through 10 show flowcharts illustrating methods that support ground truth establishment and labeling techniques using signal aggregation in accordance with aspects of the present disclosure.

FIG. 8 shows a flowchart illustrating a method 800 that supports ground truth establishment and labeling techniques using signal aggregation in accordance with aspects of the present disclosure. The operations of the method 800 may be implemented by an identity management system or its components as described herein. For example, the operations of the method 800 may be performed by an identity management system as described with reference to FIGS. 1 through 7. In some examples, an identity management system may execute a set of instructions to control the functional elements of the identity management system to perform the described functions. Additionally, or alternatively, the identity management system may perform aspects of the described functions using special-purpose hardware.

At 805, the method may include obtaining, over a duration and from a set of multiple data sources, a set of multiple data signals associated with a user of a set of multiple users of an identity management system, where the set of multiple data signals are obtained via at least a device of the identity management system. The operations of block 805 may be performed in accordance with examples as disclosed herein. In some examples, aspects of the operations of 805 may be performed by a collection component 625 as described with reference to FIG. 6.

At 810, the method may include storing the set of multiple data signals in a database associated with the identity management system. The operations of block 810 may be performed in accordance with examples as disclosed herein. In some examples, aspects of the operations of 810 may be performed by a database component 630 as described with reference to FIG. 6.

At 815, the method may include assigning, at the device of the identity management system, a label to the user based on the database, where the label indicates whether the user is malicious or benign. The operations of block 815 may be performed in accordance with examples as disclosed herein. In some examples, aspects of the operations of 815 may be performed by a label component 635 as described with reference to FIG. 6.

At 820, the method may include calculating, at the device of the identity management system, a confidence level for a risk assessment product of the identity management system based on a comparison between the label and one or more outputs of the risk assessment product, where the confidence level indicates a confidence of the risk assessment product to classify the user as malicious or benign. The operations of block 820 may be performed in accordance with examples as disclosed herein. In some examples, aspects of the operations of 820 may be performed by an evaluation component 640 as described with reference to FIG. 6.

Figure 9:
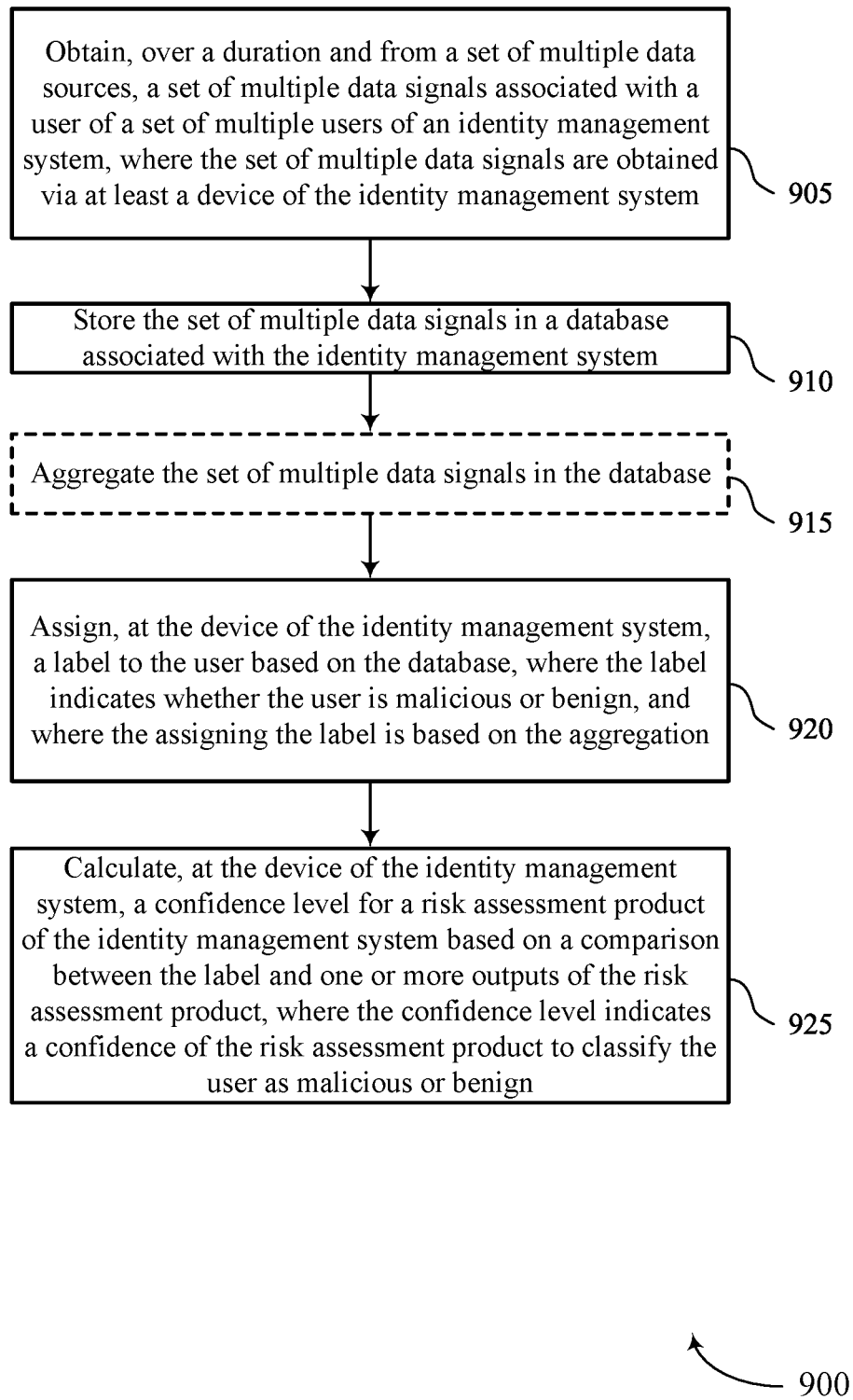

FIG. 9 shows a flowchart illustrating a method 900 that supports ground truth establishment and labeling techniques using signal aggregation in accordance with aspects of the present disclosure. The operations of the method 900 may be implemented by an identity management system or its components as described herein. For example, the operations of the method 900 may be performed by an identity management system as described with reference to FIGS. 1 through 7. In some examples, an identity management system may execute a set of instructions to control the functional elements of the identity management system to perform the described functions. Additionally, or alternatively, the identity management system may perform aspects of the described functions using special-purpose hardware.

At 905, the method may include obtaining, over a duration and from a set of multiple data sources, a set of multiple data signals associated with a user of a set of multiple users of an identity management system, where the set of multiple data signals are obtained via at least a device of the identity management system. The operations of block 905 may be performed in accordance with examples as disclosed herein. In some examples, aspects of the operations of 905 may be performed by a collection component 625 as described with reference to FIG. 6.

At 910, the method may include storing the set of multiple data signals in a database associated with the identity management system. The operations of block 910 may be performed in accordance with examples as disclosed herein.

In some examples, aspects of the operations of 910 may be performed by a database component 630 as described with reference to FIG. 6.

At 915, the method may include aggregating the set of multiple data signals in the database. The operations of block 915 may be performed in accordance with examples as disclosed herein. In some examples, aspects of the operations of 915 may be performed by a database component 630 as described with reference to FIG. 6.

At 920, the method may include assigning, at the device of the identity management system, a label to the user based on the database, where the label indicates whether the user is malicious or benign, and where the assigning the label is based on the aggregation. The operations of block 920 may be performed in accordance with examples as disclosed herein. In some examples, aspects of the operations of 920 may be performed by a label component 635 as described with reference to FIG. 6.

At 925, the method may include calculating, at the device of the identity management system, a confidence level for a risk assessment product of the identity management system based on a comparison between the label and one or more outputs of the risk assessment product, where the confidence level indicates a confidence of the risk assessment product to classify the user as malicious or benign. The operations of block 925 may be performed in accordance with examples as disclosed herein. In some examples, aspects of the operations of 925 may be performed by an evaluation component 640 as described with reference to FIG. 6.

Figure 10:
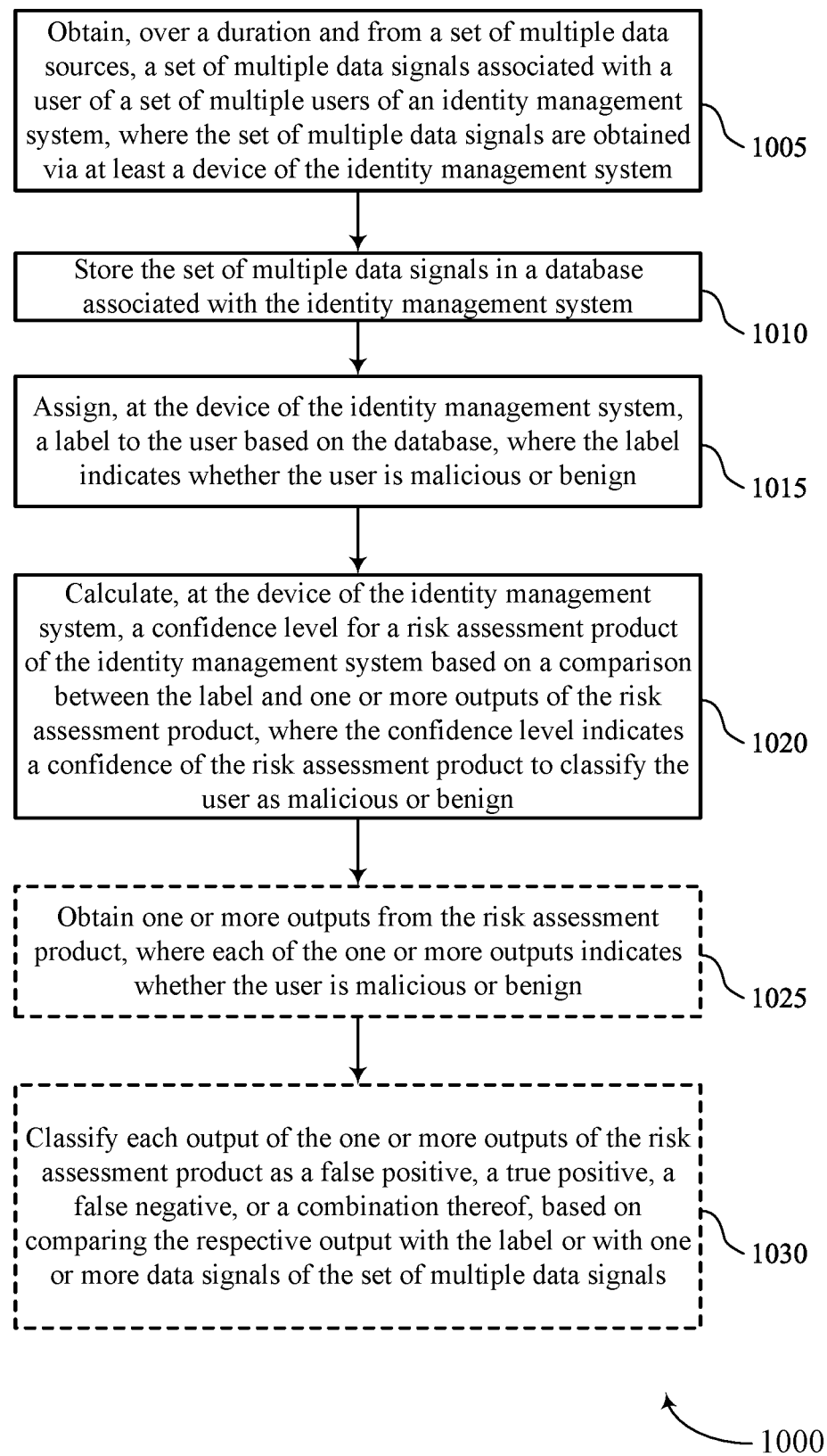

FIG. 10 shows a flowchart illustrating a method 1000 that supports ground truth establishment and labeling techniques using signal aggregation in accordance with aspects of the present disclosure. The operations of the method 1000 may be implemented by an identity management system or its components as described herein. For example, the operations of the method 1000 may be performed by an identity management system as described with reference to FIGS. 1 through 7. In some examples, an identity management system may execute a set of instructions to control the functional elements of the identity management system to perform the described functions. Additionally, or alternatively, the identity management system may perform aspects of the described functions using special-purpose hardware.

At 1005, the method may include obtaining, over a duration and from a set of multiple data sources, a set of multiple data signals associated with a user of a set of multiple users of an identity management system, where the set of multiple data signals are obtained via at least a device of the identity management system. The operations of block 1005 may be performed in accordance with examples as disclosed herein. In some examples, aspects of the operations of 1005 may be performed by a collection component 625 as described with reference to FIG. 6.

At 1010, the method may include storing the set of multiple data signals in a database associated with the identity management system. The operations of block 1010 may be performed in accordance with examples as disclosed herein. In some examples, aspects of the operations of 1010 may be performed by a database component 630 as described with reference to FIG. 6.

At 1015, the method may include assigning, at the device of the identity management system, a label to the user based on the database, where the label indicates whether the user is malicious or benign. The operations of block 1015 may be performed in accordance with examples as disclosed herein.

In some examples, aspects of the operations of 1015 may be performed by a label component 635 as described with reference to FIG. 6.

At 1020, the method may include calculating, at the device of the identity management system, a confidence level for a risk assessment product of the identity management system based on a comparison between the label and one or more outputs of the risk assessment product, where the confidence level indicates a confidence of the risk assessment product to classify the user as malicious or benign. The operations of block 1020 may be performed in accordance with examples as disclosed herein. In some examples, aspects of the operations of 1020 may be performed by an evaluation component 640 as described with reference to FIG. 6.

At 1025, the method may include obtaining one or more outputs from the risk assessment product, where each of the one or more outputs indicates whether the user is malicious or benign. The operations of block 1025 may be performed in accordance with examples as disclosed herein. In some examples, aspects of the operations of 1025 may be performed by a product component 645 as described with reference to FIG. 6.

At 1030, the method may include classifying each output of the one or more outputs of the risk assessment product as a false positive, a true positive, a false negative, or a combination thereof, based on comparing the respective output with the label or with one or more data signals of the set of multiple data signals. The operations of block 1030 may be performed in accordance with examples as disclosed herein. In some examples, aspects of the operations of 1030 may be performed by an evaluation component 640 as described with reference to FIG. 6.

The following provides an overview of aspects of the present disclosure:

Aspect 1: A method for risk assessment at an identity management system, comprising: obtaining, over a duration and from a plurality of data sources, a plurality of data signals associated with a user of a plurality of users of the identity management system, wherein the plurality of data signals are obtained via at least a device of the identity management system; storing the plurality of data signals in a database associated with the identity management system; assigning, at the device of the identity management system, a label to the user based at least in part on the database, wherein the label indicates whether the user is malicious or benign; and calculating, at the device of the identity management system, a confidence level for a risk assessment product of the identity management system based at least in part on a comparison between the label and one or more outputs of the risk assessment product, wherein the confidence level indicates a confidence of the risk assessment product to classify the user as malicious or benign.

Aspect 2: The method of aspect 1, wherein storing the plurality of data signals in the database comprises: aggregating the plurality of data signals in the database, wherein the assigning the label is based at least in part on the aggregation.

Aspect 3: The method of any of aspects 1 through 2, further comprising: obtaining one or more outputs from the risk assessment product, wherein each of the one or more outputs indicates whether the user is malicious or benign; and classifying each output of the one or more outputs of the risk assessment product as a false positive, a true positive, a false negative, or a combination thereof, based at least in part on comparing the respective output with the label or with one or more data signals of the plurality of data signals.

Aspect 4: The method of aspect 3, wherein the confidence level is based at least in part on a first quantity of false positives, a second quantity of true positives, a third quantity of false negatives, or a combination thereof.

Aspect 5: The method of any of aspects 3 through 4, further comprising: assigning, to an output of the one or more outputs and for each data signal of the one or more data signals, a false positive instance, a true positive instance, or a false negative instance based at least in part on comparing the output with the respective data signal; and combining, using a mathematical function, the false positive instances, the true positive instances, or the false negative instances, wherein the classifying the output is based at least in part on the mathematical function.

Aspect 6: The method of any of aspects 1 through 5, wherein the plurality of data sources comprises a native source, a data source associated with a remediation procedure, an internal source, an external source, or a combination thereof.

Aspect 7: The method of any of aspects 1 through 6, wherein the plurality of data signals comprises a report of suspicious activity from the user or an administrator, a multi-factor authentication confirmation, a security intelligence signal, a feed from a third party entity different from the user, or a combination thereof.

Aspect 8: The method of any of aspects 1 through 7, wherein the database is updated at a first periodicity, assigning the label is repeated at a second periodicity, and calculating the confidence level is repeated at a third periodicity.

Aspect 9: The method of any of aspects 1 through 8, wherein assigning the label comprises: assigning the label to a set of data signals of the plurality of data signals, the set of data signals corresponding to an internet protocol address, an organization, or a session with the identity management system.

Aspect 10: The method of any of aspects 1 through 9, wherein the label is applicable to a quantity of requests of the user or is applicable to the user over a second duration.

Aspect 11: An apparatus comprising one or more memories storing processor-executable code, and one or more processors coupled with the one or more memories and individually or collectively operable to execute the code to cause the apparatus to perform a method of any of aspects 1 through 10.

Aspect 12: An apparatus comprising at least one means for performing a method of any of aspects 1 through 10.

Aspect 13: A non-transitory computer-readable medium storing code the code comprising instructions executable by a processor to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for risk assessment at an identity management system, comprising:
    obtaining, over a duration and from a plurality of data sources, a plurality of data signals associated with a first user of a plurality of users of the identity management system, wherein the plurality of data signals are obtained via at least a device of the identity management system;
    storing the plurality of data signals in a database associated with the identity management system;
    assigning, at the device of the identity management system, a label to the first user based at least in part on the database, wherein the label indicates whether the first user is malicious or benign;
    obtaining one or more outputs of a risk assessment product, wherein each of the one or more outputs indicates whether the first user is malicious or benign; and
    calculating, at the device of the identity management system, a confidence level for the risk assessment product of the identity management system based at least in part on a comparison between the label of the first user and the one or more outputs of the risk assessment product obtained from the risk assessment product, wherein the confidence level indicates a confidence of the risk assessment product to correctly classify the first user as malicious or benign.

2. The method of claim 1, wherein storing the plurality of data signals in the database comprises:
    aggregating the plurality of data signals in the database, wherein assigning the label is based at least in part on aggregating the plurality of data signals.

3. The method of claim 1, further comprising:
    classifying each output of the one or more outputs of the risk assessment product as a false positive, a true positive, a false negative, or a combination thereof, based at least in part on comparing a respective output of the one or more outputs of the risk assessment product with the label or with one or more data signals of the plurality of data signals.

4. The method of claim 3, wherein the confidence level is based at least in part on a first quantity of false positives, a second quantity of true positives, a third quantity of false negatives, or a combination thereof.

5. The method of claim 3, further comprising:
    assigning, to an output of the one or more outputs and for each data signal of the one or more data signals, a false positive instance, a true positive instance, or a false negative instance based at least in part on comparing the output with a respective data signal of the one or more data signals; and
    combining, using a mathematical function and for each data signal, the false positive instance, the true positive instance, or the false negative instance, wherein the output is classified based at least in part on the mathematical function.

6. The method of claim 1, wherein the plurality of data sources comprises a native source, a data source associated with a remediation procedure, an internal source, an external source, or a combination thereof.

7. The method of claim 1, wherein the plurality of data signals comprises a report of suspicious activity from the first user or an administrator, a multi-factor authentication confirmation, a security intelligence signal, a feed from a third party entity different from the first user, or a combination thereof.

8. The method of claim 1, wherein the database is updated at a first periodicity, assigning the label is repeated at a second periodicity, and calculating the confidence level is repeated at a third periodicity.

9. The method of claim 1, wherein assigning the label comprises:

assigning the label to a set of data signals of the plurality of data signals, the set of data signals corresponding to an internet protocol address, an organization, or a session with the identity management system.

10. The method of claim 1, wherein the label is applicable to a quantity of requests of the first user or is applicable to the first user over a second duration.

11. An apparatus for risk assessment at an identity management system, comprising:
one or more memories storing processor-executable code; and
one or more processors coupled with the one or more memories and individually or collectively operable to execute the code to cause the apparatus to:
obtain, over a duration and from a plurality of data sources, a plurality of data signals associated with a first user of a plurality of users of the identity management system;
store the plurality of data signals in a database associated with the identity management system;
assign a label to the first user based at least in part on the database, wherein the label indicates whether the first user is malicious or benign;
obtain one or more outputs of a risk assessment product, wherein each of the one or more outputs indicates whether the first user is malicious or benign; and
calculate a confidence level for the risk assessment product of the identity management system based at least in part on a comparison between the label of the first user and the one or more outputs of the risk assessment product obtained from the risk assessment product, wherein the confidence level indicates a confidence of the risk assessment product to correctly classify the first user as malicious or benign.

12. The apparatus of claim 11, wherein, to store the plurality of data signals in the database, the one or more processors are individually or collectively operable to execute the code to cause the apparatus to:
aggregate the plurality of data signals in the database, wherein assigning the label is based at least in part on aggregating the plurality of data signals.

13. The apparatus of claim 11, wherein the one or more processors are individually or collectively further operable to execute the code to cause the apparatus to:
classify each output of the one or more outputs of the risk assessment product as a false positive, a true positive, a false negative, or a combination thereof, based at least in part on comparing a respective output of the one or more outputs of the risk assessment product with the label or with one or more data signals of the plurality of data signals.

14. The apparatus of claim 13, wherein the confidence level is based at least in part on a first quantity of false positives, a second quantity of true positives, a third quantity of false negatives, or a combination thereof.

15. The apparatus of claim 13, wherein the one or more processors are individually or collectively further operable to execute the code to cause the apparatus to:
assign, to an output of the one or more outputs and for each data signal of the one or more data signals, a false positive instance, a true positive instance, or a false negative instance based at least in part on comparing the output with a respective data signal of the one or more data signals; and
combine, using a mathematical function and for each data signal, the false positive instance, the true positive instance, or the false negative instance, wherein the output is classified based at least in part on the mathematical function.

16. The apparatus of claim 11, wherein the plurality of data sources comprises a native source, a data source associated with a remediation procedure, an internal source, an external source, or a combination thereof.

17. The apparatus of claim 11, wherein the plurality of data signals comprises a report of suspicious activity from the first user or an administrator, a multi-factor authentication confirmation, a security intelligence signal, a feed from a third party entity different from the first user, or a combination thereof.

18. A non-transitory computer-readable medium storing code, the code comprising instructions executable by one or more processors to:
obtain, over a duration and from a plurality of data sources, a plurality of data signals associated with a first user of a plurality of users of an identity management system, wherein the plurality of data signals are obtained via at least a device of the identity management system;
store the plurality of data signals in a database associated with the identity management system;
assign a label to the first user based at least in part on the database, wherein the label indicates whether the first user is malicious or benign;
obtain one or more outputs of a risk assessment product, wherein each of the one or more outputs indicates whether the first user is malicious or benign; and
calculate a confidence level for the risk assessment product of the identity management system based at least in part on a comparison between the label of the first user and the one or more outputs of the risk assessment product obtained from the risk assessment product, wherein the confidence level indicates a confidence of the risk assessment product to correctly classify the first user as malicious or benign.

19. The non-transitory computer-readable medium of claim 18, wherein the instructions to store the plurality of data signals in the database are executable by the one or more processors to:
aggregate the plurality of data signals in the database, wherein assigning the label is based at least in part on aggregating the plurality of data signals.

20. The non-transitory computer-readable medium of claim 18, wherein the instructions are further executable by the one or more processors to:
classify each output of the one or more outputs of the risk assessment product as a false positive, a true positive, a false negative, or a combination thereof, based at least in part on comparing a respective output of the one or more outputs of the risk assessment product with the label or with one or more data signals of the plurality of data signals.

\* \* \* \* \*